May 11, 1926.

H. J. MELVILLE 1,583,894

FOOT REST FOR ACCELERATOR PEDALS

Filed Sept. 27, 1922

INVENTOR
Herbert J. Melville.
BY
Rex Frye
ATTORNEY

Patented May 11, 1926.

1,583,894

UNITED STATES PATENT OFFICE.

HERBERT J. MELVILLE, OF DETROIT, MICHIGAN.

FOOT REST FOR ACCELERATOR PEDALS.

Application filed September 27, 1922. Serial No. 590,794.

This invention relates to foot rests for accelerator pedals of automobiles and the like, and has for its principal object the provision of a foot rest that may be permanently fastened adjacent but out of contact with the accelerator pedal and which is movable under pressure to any desired position, thereby permitting a comforting relaxation of the foot strain ordinarily endured in holding the accelerator pedal depressed.

Another object of the invention is the arrangement of a foot rest adjacent the accelerator pedal that is tiltable to various angular positions and which is held by frictional resistance in any such position until again moved by pressure of the foot thereon.

A further object of the invention is to construct a simple and efficient foot rest that is comparatively inexpensive to manufacture and readily assembled with the movable element at all times in frictional engagement with the fixed element, provision being made for varying the frictional resistance as required.

The above and other objects of the invention will be apparent from the following description wherein reference is made to the accompanying drawings illustrating preferred embodiments of my invention, and wherein similar reference numerals designate similar parts throughout the several views.

In the drawings:—

Figure 2:
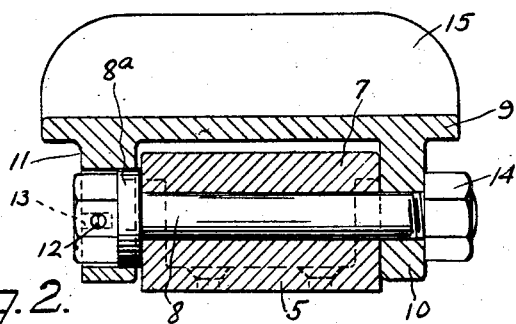
Fig. 2 is a cross section taken substantially on the line 2—2 of Fig. 1.

Referring now to the drawings the numeral 5 designates a base plate fixed in the proper position upon the floor board 6 by means of screws, or the like, and having an upstanding lug 7 adjacent one extremity perforated to receive a shoulder bolt 8 for pivotally securing the movable plate 9 upon which the driver's foot rests. The movable plate 9 is preferably formed with a pair of depending lugs 10 and 11 adapted to fit over the upstanding lug 7 of the base plate and be pivoted thereon through the medium of the shoulder bolt 8, substantially as shown in Fig. 2. In this embodiment the lug 10 is perforated with an aperture of substantially the same diameter as that in the lug 7 of the base plate, but the lug 11 of the movable plate is provided with an aperture of larger diameter and is adapted to receive the shoulder portion $8^a$ of the shoulder bolt 8, the periphery of the shoulder engaging the wall of such aperture while the inner extremity of the shoulder $8^a$ contacts directly against the side of the lug 7 of the base plate. The head of the bolt may be of any desired shape and is preferably apertured to receive a cotter pin 12, the extremities of which extend into aligned notches 13 in the lug 11 to prevent independent rotation of the bolt 8. A nut 14 is threaded upon the opposite extremity of the bolt 8 and is turned until its inner extremity engages the outer wall of the lug 10 and binds thereagainst. By virtue of this construction the turning of the nut 14 draws the lug 10 toward the lug 7 of the base plate 5 until it firmly engages thereagainst, the shoulder $8^a$ of the bolt serving as an anchor, as may be best seen in Fig. 2. Suitable means may be employed for locking the nut 14 in any desired position. This arrangement results in frictional resistance to the oscillation of the movable plate, the inner side wall of the lug 10 on the movable plate being forced to slide around on the adjacent side wall of the lug 7 on the base plate against friction whenever the plate 9 is angularly moved by the pressure of the foot. It will be apparent that the degree of frictional resistance may be varied at will by turning the nut 14 on the bolt 8 to bind the lug 10 more or less firmly against the lug 7 on the base plate. In practice, the bolt 14 is turned until the frictional resistance offered to oscillation of the plate 9 is such as to be readily overcome by the ordinary foot pressure used by the particular driver, yet sufficiently great to hold the plate 9 in any desired angular position except when direct pressure is applied upon it.

Figure 1:
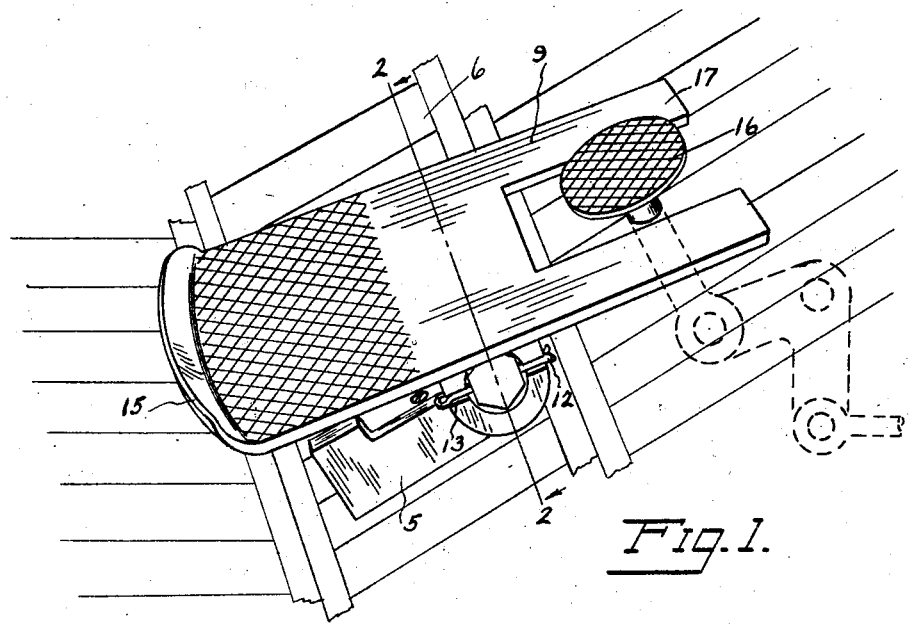
Fig. 1 is a perspective view of my improved foot rest in position upon the floor board of an automobile.

The rear extremity of the movable plate 9 is formed with a heel-supporting portion 15 while its forward extremity is bifurcated, substantially as shown in Fig. 1, to permit the legs 17 to straddle the accelerator pedal 16 without coming in contact therewith. The surface of the plate 9 is preferably knurled or otherwise roughened as desired to prevent the accidental slipping of the foot from the plate.

Figure 3:
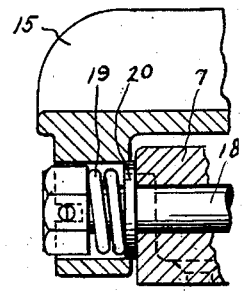
Figs. 3 and 4 are similar views showing slightly modified embodiments.

In Fig. 3 I have illustrated one method of applying spring pressure to maintain substantially uniform the frictional resistance offered to the oscillation of the movable plate, even after various adjustments for wear have been made. The bolt 18 is formed without the shoulder employed in the embodiment illustrated in Fig. 2 and a spring 19 is arranged between the head of the bolt 8 and a washer 20 adjacent the side wall of the lug 7. The spring 19 is herein shown as a coil spring, though it will be understood that this showing is merely for the purpose of exemplification and any other suitable form of spring may be employed. The function of the spring 19 is to maintain the lug 10 of the movable plate 9 in firm contact with the adjacent side wall of the lug 7 of the base plate, and by turning the nut 14 in the proper direction the spring 19 is further compressed to hold the lug 10 against the lug 7 with greater or less pressure.

Figure 4:
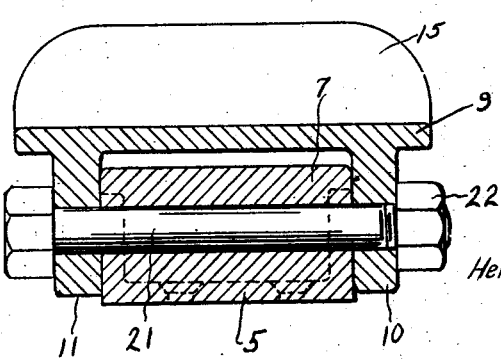

Fig. 4 shows another embodiment of my invention wherein the apertures in both the lugs 10 and 11 are of substantially the same diameter as that in the lug 7. With this construction the head of the bolt 21 engages the outer face of the lug 11 while the nut 22 engages the outer face of the lug 10, and the friction required is obtained by making a close fit between the bolt and the walls of the apertures in the lugs 10 and 11 and also by squeezing the lugs 10 and 11 toward the lug 7 until their inner side walls frictionally engage against the lug 7. By making the lugs 10 and 11 of material sufficiently light to enable their distortion by squeezing, it is possible to secure sufficient frictional resistance with the use of a simple bolt and nut as the fulcrum member.

The operation of my improved foot rest is believed to be apparent. The base plate is suitably mounted upon the floor board 6 of the car so that the legs 17 of the movable plate will extend into proximity to the accelerator pedal 16, and the nut 14 is adjusted upon the bolt 8 so as to offer the proper degree of frictional resistance to the angular movement of the plate 9. The driver thereupon rests his foot upon the upper surface of the plate 9 with the rear portion of his heel engaging the heel-supporting portion 15. The sole of his shoe engages the accelerator pedal and depresses it to the extent desired for driving the car at usual speed in starting or driving about city streets. The legs 17 of the movable plate 9 are normally set at such an angle that when the pedal 16 has been depressed to the desired extent the foot of the driver rests fully upon the upper surface of the plate 9 and the driver then does not have to exert pressure to maintain the pedal 16 depressed. When it is desired to maintain the speed of the car at a greater rate than ordinary, as for example when touring, the driver presses with the sole portion of his shoe against the legs 17 of the plate 9, thereby rocking the plate 9 against the frictional resistance offered by the sliding engagement of the lug 10 against the lug 7. The foot may then rest easily upon the plate 9 without exertion on the part of the driver while the accelerator pedal is held depressed to the further extent desired. In this manner the driver may tour for hours at comparatively high speeds without keeping his foot under the tension ordinarily required, but may relax comfortably while permitting merely the weight of his foot to hold the accelerator pedal in depressed position. When it is desired to again drive at more moderate speeds the driver presses with his heel upon the rear portion of the plate 9 so as to swing the legs 17 upwardly to the desired position to enable the foot to rest easily on the plate 9 and hold the pedal 16 depressed to a more limited extent.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

Having described my invention I claim:—

A foot rest for accelerator pedals and the like comprising a fixed member having an apertured lug thereon, a movable member having a pair of depending lugs adapted to fit over the lug on the fixed member and respectively provided with apertures of different diameters, a shoulder bolt arranged in the apertures of all of the lugs with the periphery of the shoulder fitting within the larger apertured lug on the movable member and with its inner extremity engaging the adjacent wall of the fixed lug, and a nut threaded on the bolt in engagement with the outer wall of the smaller apertured movable lug.

In witness whereof I hereunto set my hand.

HERBERT J. MELVILLE.